United States Patent
Seo

(10) Patent No.: US 11,731,226 B2
(45) Date of Patent: Aug. 22, 2023

(54) VIBRATION DAMPING DEVICE FOR MACHINE TOOL SPINDLE AND MACHINE TOOL COMPRISING SAME

(71) Applicant: DN Solutions Co., Ltd., Changwon-si (KR)

(72) Inventor: Eunsoo Seo, Changwon-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 120 days.

(21) Appl. No.: 17/439,823

(22) PCT Filed: Feb. 19, 2020

(86) PCT No.: PCT/KR2020/002369
§ 371 (c)(1),
(2) Date: Sep. 16, 2021

(87) PCT Pub. No.: WO2020/197094
PCT Pub. Date: Oct. 1, 2020

(65) Prior Publication Data
US 2022/0088733 A1    Mar. 24, 2022

(30) Foreign Application Priority Data

Mar. 27, 2019 (KR) .......................... 10-2019-0034765

(51) Int. Cl.
*B23Q 5/04* (2006.01)
*B23Q 11/00* (2006.01)
*F16F 15/14* (2006.01)

(52) U.S. Cl.
CPC .......... *B23Q 5/043* (2013.01); *B23Q 11/0035* (2013.01); *F16F 15/1414* (2013.01); *F16F 2222/08* (2013.01); *F16F 2232/02* (2013.01)

(58) Field of Classification Search
CPC ............................ B23Q 5/043; B23Q 11/0035
See application file for complete search history.

(56) References Cited

U.S. PATENT DOCUMENTS 3,522,864 A * 8/1970 Richter .................. F16F 7/104
188/380
3,995,513 A * 12/1976 Amdall .................. F16F 15/10
464/92
(Continued)

FOREIGN PATENT DOCUMENTS

CN    108422260 A  *  8/2018   ......... B23Q 11/0035
JP    H05318268 A      12/1993
(Continued)

OTHER PUBLICATIONS

International Search Report of PCT/KR2020/002369, dated Jun. 1, 2020,English translation.

*Primary Examiner* — Melanie Torres Williams
(74) *Attorney, Agent, or Firm* — STIP Law Group, LLC

(57) ABSTRACT

A vibration damping device for a machine tool spindle is provided. An annular support plate is mounted at a lower portion of a distal end of the spindle, a plurality of support bars is fixed to the support plate in a vertical direction and installed in a longitudinal direction of the spindle adjacent to an outer periphery of the spindle, a pair of weight disks stacked by a plurality of arc-shaped disks made of a tuned mass member is fixed to be in close contact with the outer periphery of the spindle, facing each other, and a damping sheet made of an elastic member is inserted between the outer periphery of the spindle and the weight disks. The vibration damping device of the present invention may maximize a vibration damping effect by installing the vibration damping device at a position closest to the spindle where a vibration occurs. Furthermore, the vibration damping device of the present invention may effectively attenuate a variety of vibration phenomena having various resonant frequencies of a machine tool spindle by constituting the (Continued)

vibration damping device in a plurality of modular types which have different resonant frequency bands, respectively.

5 Claims, 7 Drawing Sheets

(56) References Cited

U.S. PATENT DOCUMENTS

| | | | |
|---|---|---|---|
| 6,719,503 B1 * | 4/2004 | McCalmont | B23Q 17/0976 |
| | | | 188/380 |
| 8,656,807 B2 * | 2/2014 | McCalmont | G01P 1/003 |
| | | | 464/71 |
| 2005/0167213 A1 * | 8/2005 | Crissy | F16D 65/10 |
| | | | 188/130 |
| 2007/0243033 A1 * | 10/2007 | Hashimoto | B23Q 11/0035 |
| | | | 409/141 |
| 2008/0089754 A1 | 4/2008 | Fronius et al. | |
| 2018/0202515 A1 * | 7/2018 | Fujiwara | F16F 15/1457 |

FOREIGN PATENT DOCUMENTS

| | | | |
|---|---|---|---|
| JP | 2007021657 A | | 2/2007 |
| JP | 2010042464 A | | 2/2010 |
| KR | 1020170010297 A | * | 1/2017 |
| KR | 20180040270 A | | 4/2018 |

* cited by examiner

【Fig. 1】
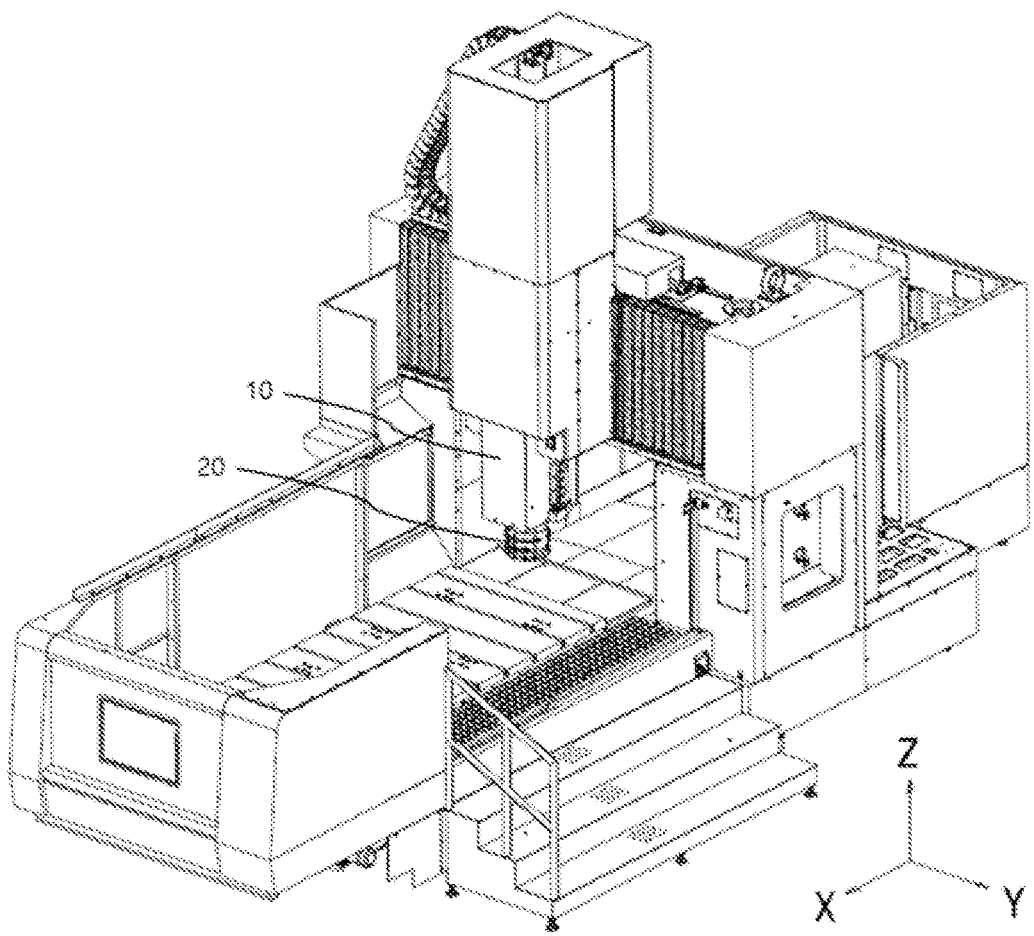

[Fig. 2]
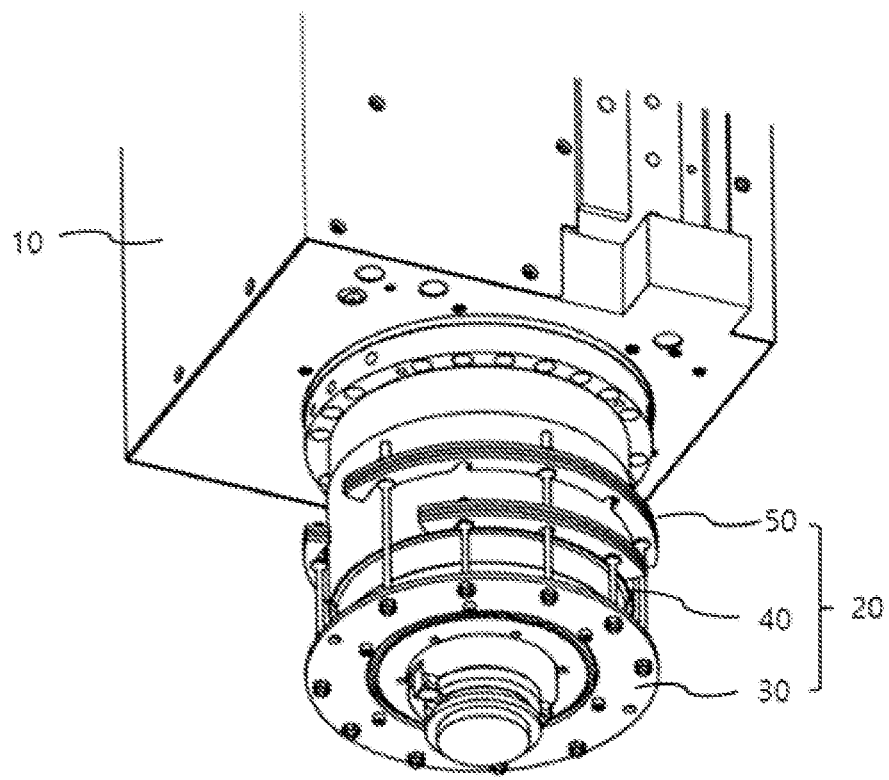

[Fig. 3]
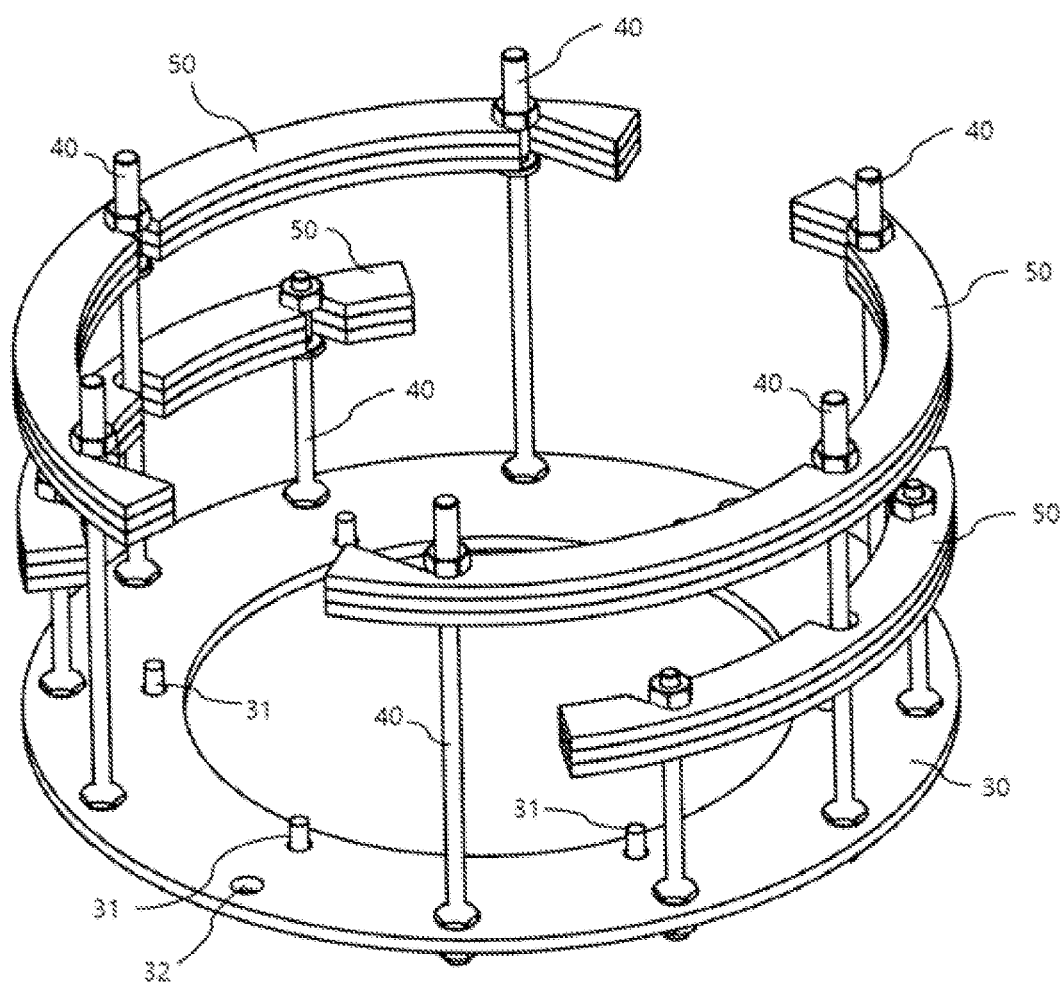

[Fig. 4]
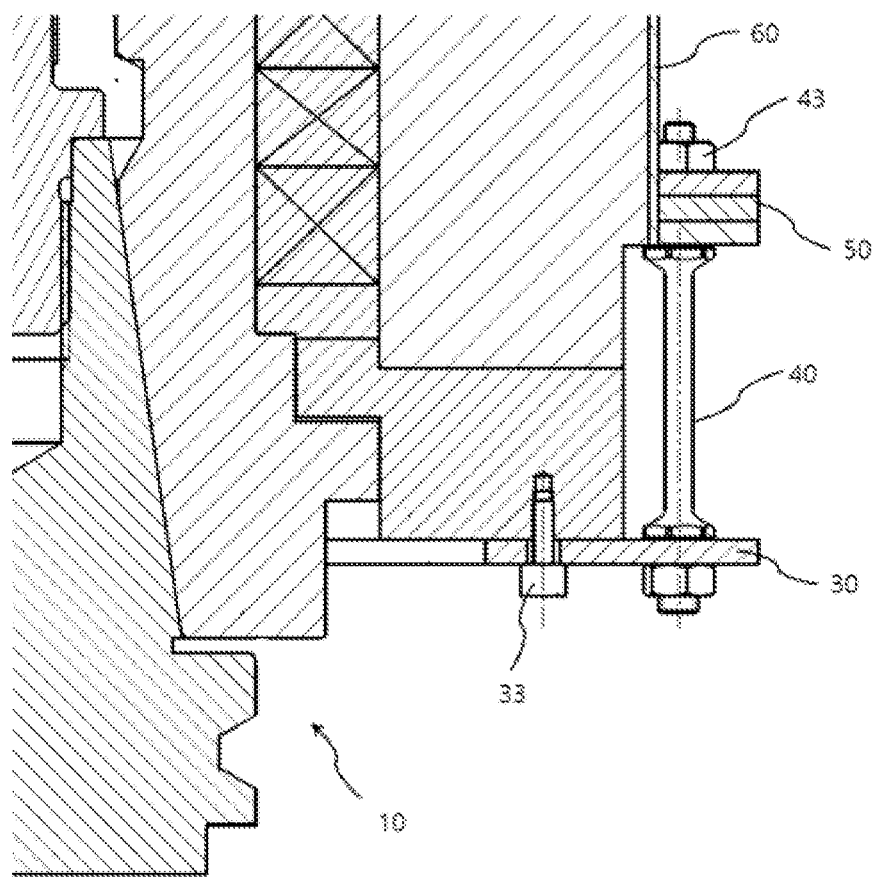

[Fig. 5]
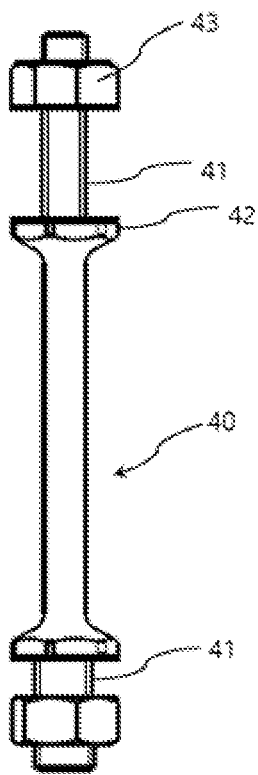

[Fig 6]
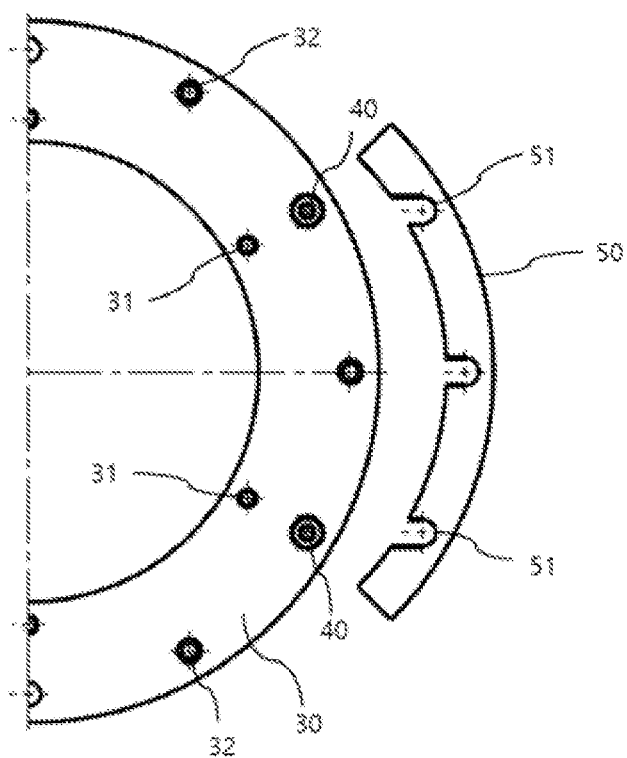

[Fig. 7]
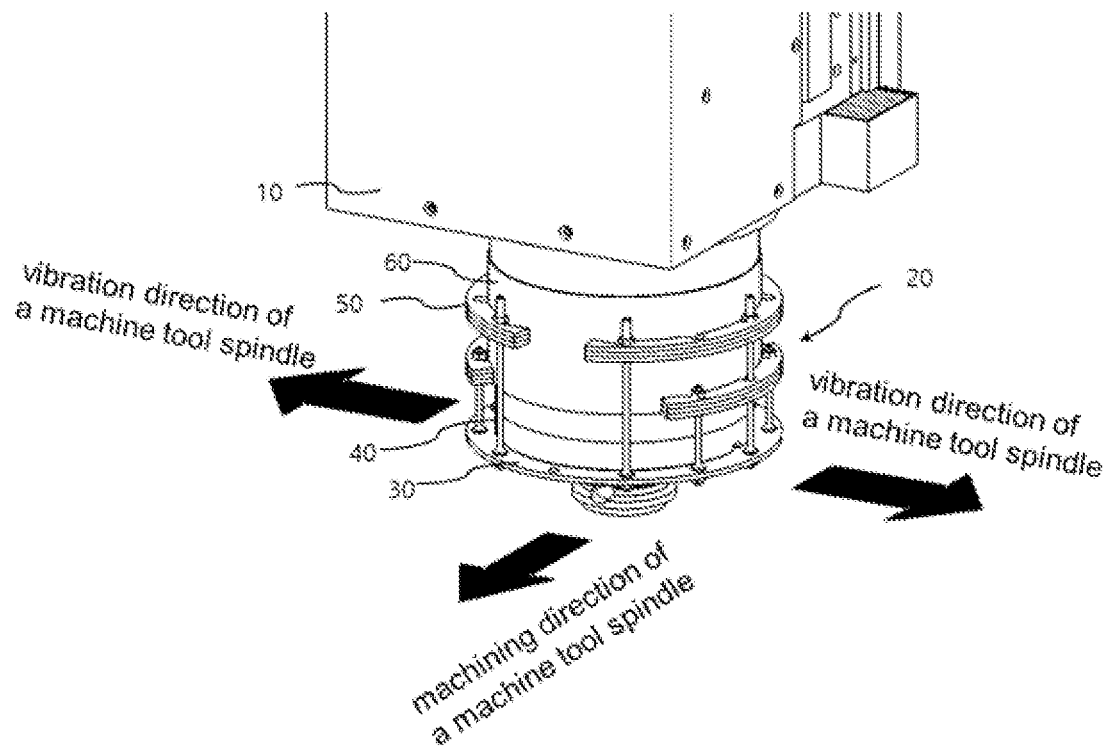

VIBRATION DAMPING DEVICE FOR MACHINE TOOL SPINDLE AND MACHINE TOOL COMPRISING SAME

CROSS-REFERENCE TO RELATED APPLICATIONS

This application is the U.S. National Phase under 35 U.S.C. § 371 of International Application No. PCT/KR2020/002369 filed on Feb. 19, 2020, which in turn claims the benefit of Korean Application No. 10-2019-0034765, filed on Mar. 27, 2019, the disclosures of which are incorporated by reference into the present application.

TECHNICAL FIELD

The present invention relates to a vibration damping device for a machine tool spindle and a machine tool having a vibration damping device at a distal end of the machine tool spindle.

BACKGROUND ART

A machine tool in operation generates a vibration due to a mass of a rotating body and a rotational speed of the rotating body or the like. In general, there has been introduced a vibration damping system in which a vibration is attenuated by attaching an additional mass to a rotating shaft where the vibration occurs. As is known, the vibration may be offset by applying a force having the same magnitude as the force transmitted through the vibration in the opposite direction. According to this theory, the vibration generated in an equipment may be suppressed by installing a Tuned Mass Damper (TMD) which has the same frequency characteristics as the resonant frequency of the equipment in the opposite direction to the vibration occurring direction.

As a related art, there has been Korean Patent Laid-Open Publication No. 110-2018-0040270 (Patent Document 1). Patent Document 1 discloses a vibration damping device where a tuned mass member elastically supported by a rigid member is installed at a rear end of the machine tool spindle to attenuate the vibration occurred at a front end of the machine tool spindle due to a machining operation. In addition, the vibration damping device of Patent Document 1 proposes to add an additional mass to the tuned mass member.

However, the vibration damping device of Patent Document 1 has a vibration damping effect only for one type of a resonant frequency having the same vibration characteristics, and such the vibration damping effect is not sufficiently obtained for several types of resonant frequencies having different vibration characteristics.

Patent Document 1 suggests a method of adding a mass member to the tuned mass member. In a case that the mass member is added to the already installed tuned mass member, the vibration damping effect may be obtained for a new resonant frequency corresponding to the characteristics of the added mass member, but there has been no vibration damping effect for other resonant frequencies.

As discussed above, the vibration damping device of Patent Document 1 has revealed the vibration damping effect only for one type of the resonant frequency, and when several types of vibrations having different resonant frequencies occur simultaneously or sporadically, the vibration attenuation function has not been effectively exhibited.

In addition, the vibration damping effect of Patent Document 1 is further deteriorated since the vibration damping device is installed at the rear end of the machine tool spindle which is a position spaced apart from the front end of the machine tool spindle where the vibration occurs.

DISCLOSURE OF INVENTION

Technical Problem

To resolve the problems discussed above, an object of the present invention is to provide a vibration damping device for a machine tool spindle that exhibits a vibration damping effect for various resonant frequencies having different vibration characteristics, and furthermore, to provide a machine tool comprising such the vibration damping device.

Another object of the present invention is to provide a vibration damping device for a machine tool spindle that further increases a vibration damping effect by installing the vibration damping device closest to a position where the vibration occurs, and a machine tool comprising such the vibration damping device.

Technical Solution

To achieve the objects discussed above, a vibration damping device for a machine tool spindle rotating a tool mounted at a distal end thereof according to one exemplary embodiment of the present invention may include a support plate mounted at a lower portion of a distal end of the machine tool spindle, a plurality of support bars fixed to the support plate in a vertical direction and installed in a longitudinal direction of the machine tool spindle adjacent to an outer periphery of the machine tool spindle, at least one pair of weight disks stacked by a plurality of arc-shaped disks made of a tuned mass member and fixed to a distal end of the support bar to be in close contact with the outer periphery of the machine tool spindle, facing each other, and a damping sheet made of an elastic member which becomes closely in contact with the outer periphery of the machine tool spindle and pressed by the weight disk.

The support plate may include a fixing pin and a fastening hole which may be configured to be fixed after being rotated to an arbitrary position at the distal end of the machine tool spindle.

The support bar may be formed in a rod shape with a metal material having elasticity, wherein threaded portions may be formed at opposite ends of the support bar and locking flanges may be formed between the threaded portions at opposite ends for supporting the weight disk, respectively, and wherein the thread portion of one end may be fastened with the support plate and the thread portion of the other end may be fastened with a fixing nut for fixing the weigh disk.

The weight disk may include a plurality of slots opened in a direction parallel to each other to which the support bar is coupled.

When two or more pairs of the weight disks are stacked, each pair of the weight disks may be composed of a tuned mass member which has a different resonant frequency characteristics.

When two or more pairs of the weight disks are stacked, each pair of the weight disks may be installed in a vertical direction, and a slot having a width greater than a diameter of the support bar may be formed in a lower weight disk at a position through which the support bar for fixing an upper weight disk passes to avoid an interference with the support bar.

The damping sheet may be made of a rubber material which may perform a damping function between the weight disk and the outer periphery of the machine tool spindle.

The support bar may be formed in a metal bar with an elastic material to allow the weight disk to press the damping sheet.

The weight disk may be installed while facing each other to the outer periphery of the machine tool spindle in a direction perpendicular to a machining direction of the machine tool spindle.

To achieve the objects discussed above, a machine tool according to the present invention may provide a machine tool to which the vibration damping device according to the exemplary embodiment of the present invention described above has been applied.

Advantageous Effects

The vibration damping device of an exemplary embodiment of the present invention may maximize a vibration damping effect by installing the vibration damping device at a position closest to the machine tool spindle where a vibration occurs.

Furthermore, the vibration damping device of an exemplary embodiment of the present invention may effectively attenuate a variety of vibration phenomena having various resonant frequencies of a machine tool spindle by constituting the vibration damping device in a plurality of modular types which have different resonant frequency bands, respectively.

DESCRIPTION OF DRAWINGS

In order that the disclosure may be well understood, there will now be described various forms thereof, given by way of example, reference being made to the accompanying drawings, in which:

FIG. 1 is a perspective view of a machine tool according to an exemplary embodiment of the present.

FIG. 2 is a bottom perspective view in detail showing a machine tool spindle assembled with a vibration damping device at a distal end thereof according to an exemplary embodiment of the present invention;

FIG. 3 is an enlarged perspective view showing a vibration damping device assembled according to an exemplary embodiment of the present invention;

FIG. 4 is a partial sectional view showing a vibration damping device assembled to the distal end of the machine tool spindle according to an exemplary embodiment of the present invention;

FIG. 5 is an enlarged front view of a support bar according to an exemplary embodiment of the present invention;

FIG. 6 is an exploded plan view showing a weight disk separated from a support plate according to an exemplary embodiment of the present invention; and FIG. 7 is a top perspective view illustrating a vibration direction and a machining direction of the machine tool spindle equipped with the vibration damping device according to an exemplary embodiment of the present invention.

MODE FOR INVENTION

The following description is merely exemplary in nature and is not intended to limit the present disclosure, application, or uses. It should be understood that throughout the drawings, corresponding reference numerals indicate like or corresponding parts and features.

Hereinafter, exemplary preferred embodiments of the present invention are described in detail with reference to the accompanying drawings, FIGS. 1 to 7.

A vibration damping device 20 according to an exemplary embodiment of the present invention may be installed at a distal end of a machine tool spindle 10 ("spindle") which is equipped with a tool (not shown) at the distal end thereof and rotates the tool for a machining operation. The main configuration of the vibration damping device 20 may include a support plate 30, a support bar 40, a weight disk 50, and a damping sheet 60. Hereinafter, each component of the vibration damping device 20 of the present invention will be described in detail.

The support plate 30 may be composed of an annular plate, and mounted at a lower portion of the distal end of spindle 10. The support plate 30 may include a plurality of fastening holes 32 and a plurality of fixing pins 31 in a circumferential direction thereof to fix the support plate 30 to an arbitrary position at the lower portion of the distal end of the spindle 10.

The support bar 40 may be fastened at a right angle to the support plate 30 while disposed adjacent to the outer periphery of the spindle 10 in a longitudinal direction of the spindle 10. In addition, the support bar 40 may be installed in plural at the support plate 30 in a circumferential direction of the support plate 30.

The support bar 40 may include a lower thread portion 41 to be fastened to the support plate 30 at a lower end thereof, and an upper thread portion 41 at an upper end thereof to which each fixing nut 43 is fastened.

A locking flange 42 may be formed at the upper thread portion 41 of the support bar 40 for supporting the weight disk 50 and at the lower thread portion 41 of the support bar 40 for supporting the support plate 30, respectively.

The weight disk 50 may be formed as a pair by stacking several arc-shaped disks made of a tuned mass member having the same resonant frequency. The pair of weight disks 50 formed as such may be installed in close contact with the outer periphery of the spindle 10 in a form facing each other. Slots 51 opened in a direction parallel to each other may be formed in the weight disk 50. The weight disk 50 having the slots 51 may be placed on the locking flange 42 of the support bar 40 through the slot 51 and then fixed by a fixing nut 43 which has been fastened to the upper thread portion 41 of the support bar 40.

One pair of the weight disks 50 facing each other may have the same resonant frequency characteristics. However, as illustrated in FIG. 3, for two pairs of the weight disk 50 disposed in the upper and lower positions, each pair of the weight disks 50 may have different resonant frequency characteristics.

When the weight disk 50 is composed of two or more pairs, each pair of the weight disks 50 may be installed in the vertical direction. The weight disk 50 installed in the lower position may include a slot 51, whose width is greater than a diameter of the support bar 40, at a position through which the support bar 40 for fixing the weight disk 50 installed in the upper position passes to avoid an interference with the support bar 40.

The damping sheet 60 may be made of a rubber material, and may be installed in close contact with the outer periphery of the spindle 10. The weight disk 50 may be installed to press the damping sheet 60 with a constant pressure by the support bar 40. Therefore, the weight disk 50 and the spindle 10 may also receive a damping effect through the damping sheet 60.

The support bar 40 may be formed in a metal bar with an elastic material to press the weight disk 50 against the damping sheet 60 at a constant pressure.

As shown in FIG. 7, the weight disk 50 may be installed, while facing each other, on the outer periphery of the spindle 10 in a direction perpendicular to a machining direction of the spindle 10.

Preferably, two or more pairs of weight disks 50 may be installed in the vertical direction so as not to interfere with each other in response to the resonant frequency characteristics of the vibration.

The vibration damping device 20 configured as described above may be applied to all the machine tools with the spindle 10 rotating the tool which have a space and a structure available for installing the vibration damping device 20 as explained in the above exemplary embodiment.

Hereinafter, an assembly process of the vibration damping device 20 with the above configurations to the spindle 10 of the machine tool will be described.

First, a damping sheet 60 made of a rubber material may be installed so as to be in close contact with the outer periphery of the spindle 10.

Then, the support plate 30 may be fixed to the lower portion of the distal end of the spindle 10. Here, fixing of the support plate 30 may be performed in a manner that the fixing pin 31 formed on the support plate 30 may be inserted into an insertion hole (not shown) formed at the lower portion of the spindle 10, and thereafter a fastening bolt (33) may be coupled with a fastening hole (32) to fix the support plate (30) at the lower portion of the distal end of the spindle (10).

Next, the support bar 40 may be coupled to the support plate 30 using the lower thread portion 41 of the support bar 40. Two or more support bars 40 per one weight disk 50, depending on the number of weight disks 50 to be fastened, may be coupled with the fastening holes 32 which are arranged in the circumferential direction of the support plate 30 at equal intervals.

The weight disk 50 may be assembled with the support bar 40 through the slots 51 of the weight disk 50 where the weight disk 50 may be supported on the locking flange 42 of the support bar 40, and then the weight disk 50 may be firmly fixed to the support bar 40 by fastening the fixing nut 43 to the upper thread portion 41 of the support bar 40.

At this time, the support bar 40 formed in a metal bar having an elasticity, may be assembled with the support plate 30 to allow the weight disk 50 to press the damping sheet 60 installed on the outer periphery of the spindle 10.

The slots 51 formed in the weight disk 50 may be opened in a direction parallel to each other. When assembling with or dissembling the weight disk 50 from the support bar 40, the weight disk 50 may be easily assembled with or dissembled from the support bar 40 in the horizontal direction by simply tightening or loosening the fixing nut 43 coupled with the upper thread portion 41 of the support bar 40.

As another exemplary embodiment of the present invention, the slot 51 formed in the weight disk 50 may be replaced with a through hole (not shown). At this time, the through hole may have a diameter through which the support bar 40 may pass without an interference. In a case of replacing the slot 51 with the through hole as such, the weight disk 50 may be assembled to the support bar 40 from an upper side of the support bar 40.

When the pair of the weight disks 50 is composed of a plurality of upper and lower layers, the pair of the weight disks 50 to be assembled in the lower position may be first assembled together with the support bar 40 on the support plate 30, and thereafter the pair of the weight disks 50 to be assembled in the upper position may be assembled together with the support bar (40) with the support plate (30).

At this time, for the convenience of the assembly operation, the weight disk 50 to be assembled in the lower position may be formed with the slot 51 rather than the through hole at a location where the support bar 40 supplying the weight disk 50 to be assembled in the upper position passes through.

The vibration damping device of the present invention assembled as the above may generate a vibration in a direction perpendicular to a machining direction of the spindle 10 as the machine tool proceeds the machining operation.

The vibration having a resonant frequency with a specific region generated at the spindle 10 may be transmitted to the weight disk 50 through the support plate 30 and the support bar 40.

Since the weight disk 50 may be made of a tuned mass member, it may attenuate the vibration being transmitted with the resonant frequency according to a mass characteristics of the tuned mass member.

Meanwhile, depending on structural characteristics of the machine tool or characteristics of the workpiece or the tool, there may have been generated vibrations having the resonant frequencies with different bands. In this case, such vibrations may be attenuated by installing another pair of the weight disks 50 having a different resonant frequency characteristics in the vertical direction.

When two or more pairs of the weight disk 50 are installed in the vertical direction at the support plate 30 as described above, the weight disk 50 to be assembled in the lower position may be formed with additional slots 51 so that the support bar 40 supporting the weight disk 50 to be assembled in the upper position may pass through without an interference.

Even if two or more pairs of the weight disks 50 are installed at the support plate 30 in the vertical direction, the support bar 40 for fixing the weight disk 50 installed in the upper position may not come into contact with the weight disk 50 installed in the lower position and independently support the weight disk 50 in the upper position, thereby exhibiting vibration damping effects suitable for respective resonant frequency characteristics without causing an interference between the weight disks 50 assembled in the upper and lower positions, respectively.

Meantime, as the weight disk 50 may maintain a pressurizing state against the damping sheet 60, some vibration damping effects may be obtained between the spindle 10 and the weight disk 50 through the damping sheet 60.

The vibration damping device 20 of the present invention may effectively respond to a change of the vibration direction of the spindle 10 in such a manner that the fastening bolt 33 fixing the support bar 40 to the support plate 30 may be firstly loosened according to the direction of the vibration generated in the spindle 10, a direction or a position of the support plate 30 with respect to the spindle 10 may be changed, the fixing pin 31 formed at the support plate 30 may be inserted into an insertion hole (not shown) formed at the lower portion of the spindle 10, and the fastening bolt 33 may be fastened again with the fixing pin 31.

As described above, the vibration damping device 20 of an exemplary embodiment of the present invention may maximize a vibration damping effect by installing the vibration damping device 20 at a position closest to the spindle 10 where a vibration occurs.

Furthermore, the vibration damping device 20 of an exemplary embodiment of the present n may effectively attenuate a variety of vibration phenomena having various resonant frequencies of a machine tool spindle 10 by constituting the vibration damping device 20 in a plurality of modular types which have different resonant frequency bands, respectively.

EXPLANATION OF SIGN

10: spindle
20: vibration damping device
30: support plate
31: fixing pin
32: fastening hole
33: fastening bolt
41: thread portion
42: locking flange
43: fixing nut
50: weight disk
51: slot
60: damping sheet

What is claimed is:

1. A vibration damping device for a machine tool spindle rotating a tool mounted at a distal end thereof, the vibration damping device comprising:
    a support plate mounted at a lower portion of a distal end of the machine tool spindle;
    a plurality of support bars fixed to the support plate in a vertical direction and installed in a longitudinal direction of the machine tool spindle adjacent to an outer periphery of the machine tool spindle;
    at least one pair of weight disks facing each other, wherein each of the weight disks comprises a plurality of arc-shaped disks and is formed by stacking the plurality of arc-shaped disks, and the plurality of arc-shaped disks are made of a tuned mass member and fixed to a distal end of the support bar to be in close contact with the outer periphery of the machine tool spindle; and
    a damping sheet made of an elastic member which becomes closely in contact with the outer periphery of the machine tool spindle and pressed by the at least one pair of weight disks,
    wherein
    the support bar is formed in a rod shape with a metal material having elasticity, wherein threaded portions are formed at opposite ends of the support bar and locking flanges are formed between the threaded portions at opposite ends for supporting the at least one pair of weight disks, respectively, and
    the thread portion of one end is fastened with the support plate and the thread portion of the other end is fastened with a fixing nut for fixing the at least one pair of weight disks.

2. The vibration damping device of claim 1, wherein the weight disk includes a plurality of slots opened in a direction parallel to each other to which the support bar is coupled.

3. The vibration damping device of claim 1, wherein when two or more pairs of the weight disks are stacked, each pair of the weight disks is composed of a tuned mass member which has a different resonant frequency characteristics.

4. The vibration damping device of claim 3, wherein when two or more pairs of the weight disks are stacked, each pair of the weight disks is installed in a vertical direction, and a slot having a width greater than a diameter of the support bar is formed in a lower weight disk at a position through which the support bar for fixing an upper weight disk passes to avoid an interference with the support bar.

5. The vibration damping device of claim 1, wherein the support bar is formed in a metal bar with an elastic material to allow the weight disk to press the damping sheet.

\* \* \* \* \*